United States Patent [19]

Lindner et al.

[11] 3,918,795

[45] Nov. 11, 1975

[54] RETRO-REFLECTOR CONSTRUCTION

[75] Inventors: Henry Lindner, Woodale; James D. Kennedy, Streamwood, both of Ill.

[73] Assignee: Beatrice Foods Co., -Elgin Molded Plastics Div., Elgin, Ill.

[22] Filed: Feb. 4, 1974

[21] Appl. No.: 439,043

Related U.S. Application Data

[63] Continuation-in-part of Ser. No. 351,308, April 16, 1973, abandoned.

[52] U.S. Cl................. 350/103; 116/63 P; 350/109
[51] Int. Cl.²......................................... G02B 5/124
[58] Field of Search .................116/63 P; 350/97, 99, 102–109

[56] References Cited
UNITED STATES PATENTS

| | | | |
|---|---|---|---|
| 3,399,477 | 9/1968 | Johnson, Jr. et al............ | 350/103 X |
| 3,458,245 | 7/1969 | Stanley .......................... | 350/103 X |
| 3,766,881 | 10/1973 | Ward.............................. | 350/97 X |
| 3,781,082 | 12/1973 | Linder ........................... | 350/97 X |

*Primary Examiner*—John K. Corbin
*Attorney, Agent, or Firm*—Hill, Gross, Simpson, Van Santen, Steadman, Chiara & Simpson

[57] ABSTRACT

A construction suitable for incorporation into a display device, reflector, or the like. The construction employs a flattened, molded body of transparent material having a smooth front face and a back face with a plurality of lenticular facets therein adapted for retro-reflection of incident light striking the front face. The body has a pair of spaced, parallel upstanding flanges peripherally extending around the back face. A pair of such bodies may be sonically welded together across abutting portions of inner flange members. The bodies can be used with a variety of mounting frames.

16 Claims, 14 Drawing Figures

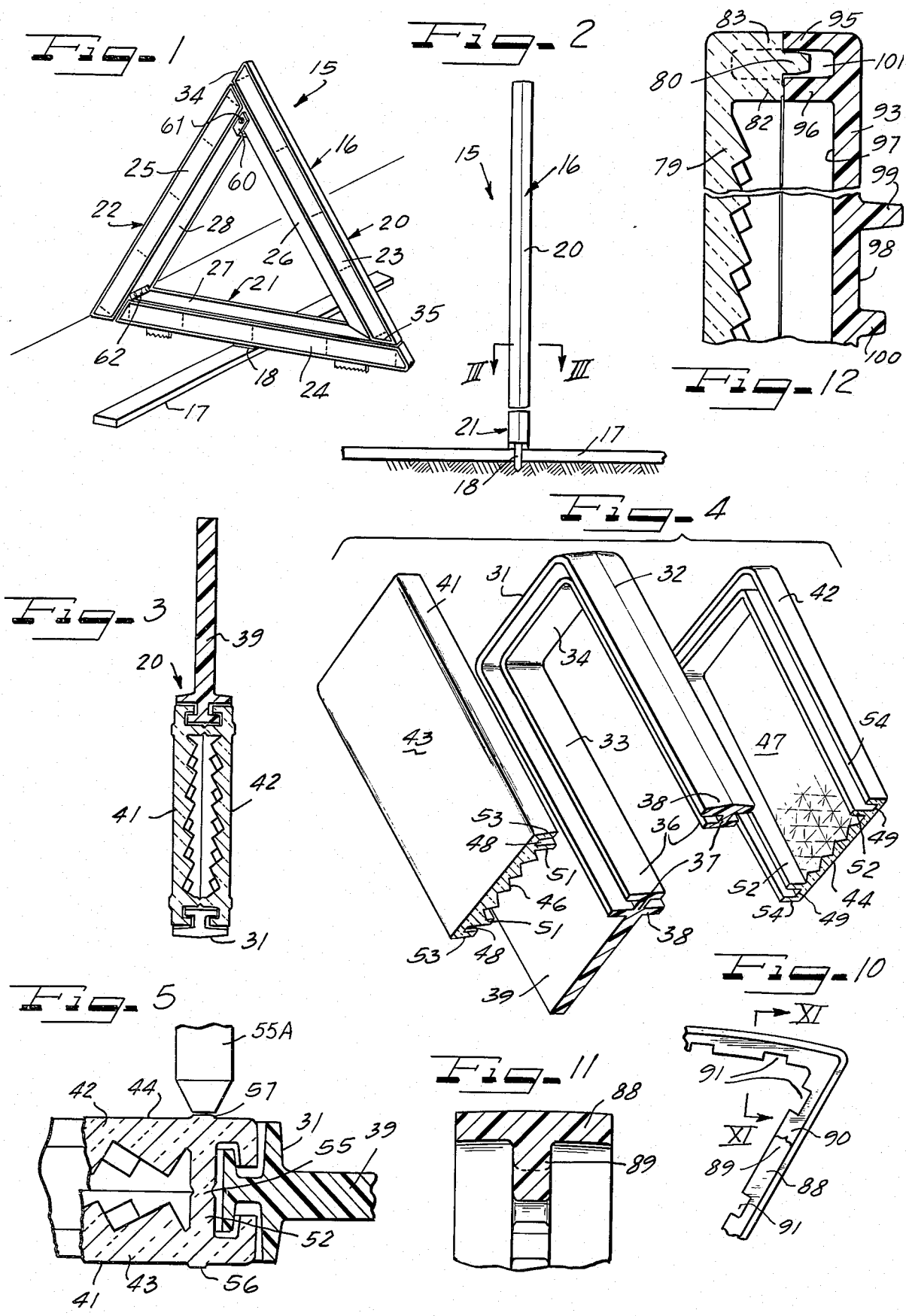

RETRO-REFLECTOR CONSTRUCTION

This application is a continuation-in-part application of our earlier filed U.S. patent application Ser. No. 351,308 filed Apr. 16, 1973, now abandoned.

BACKGROUND OF THE INVENTION

In the manufacture of display devices, warning devices, reflector devices, and the like it has become popular to utilize in a single such device more than a single element, and, in particular, it has become common to employ two or more different types of plastic materials in combination to form such a device, owing not only to the manufacturing economies associated with the use of plastic materials, but also to the superior effectiveness and use properties of the resulting devices made therewith.

When utilizing such plastic materials to manufacture such a device, it is usual first to form the separate elements or subassemblies, as by molding, extruding, or the like. Then, thereafter, such formed elements are assembled into the desired display or other device. Such an assembly procedure can involve such an appreciable amount of labor that a product device has an excessive cost associated with its manufacture, as many manufacturers have found to their detriment. It is therefore of basic importance in the manufacture of plastic display devices utilizing two or more different plastic elements in respective preformed configurations to so construct such individual elements as to minimize the subsequent labor required to complete assembly of the final product device.

One common construction utilized in a variety of display and warning devices incorporates a reflective border member which circumscribes an interior area. Sometimes the entire interior area is itself a place for display of information; other times, such interior area is left open except perhaps in areas adjacent the border member. Contemporary construction practice involves the use of reflex reflector panels as such border members; such panels are separately formed or molded of a polymer, such as an acrylic resin, or the like. These reflectorized panels are then mounted into a preformed border frame member or members, formed of a vinyl polymer, or the like, in a subsequent assembly operation. It is typical that such a produce device is costly owing to the large number of assembly steps and time-consuming operations utilized in this assembly operation. Furthermore, it is very common to find that the product device is not as rugged as desired and may be easily damaged or injured in normal use environments, so that the product device has a short life.

Another common construction involves flattened, molded, reflex-reflective bodies secured together by some means at edge portions to either another such body or to a frame member. Such a construction is widely used as a warning or indicating device in many different applications, both at stationary sites as well as on moving vehicles.

The art is continuously seeking new and better techniques for fabricating such devices in a more efficient and economical manner, and so as to have improved rigidity and stability over a wide variety of use conditions.

BRIEF SUMMARY OF THE INVENTION

The present invention is concerned with a reflector construction which is adapted for incorporation into a display device or the like and which can, and is intended to, provide structural improvements over the known prior art constructions adapted for similar uses.

Specifically, the present invention provides a simple, effective and economical means for fabricating transparent molded retro-reflective bodies suitable for use in display, warning and like functions. A construction utilizing the principles of the present invention can be rapidly assembled from preformed plastic components and the product construction is adapted to display great rigidity and stability over a wide variety of use and environmental conditions.

The present invention is useful in the manufacture of triangular warning devices of the type adapted to prevent rear end collisions between on-coming traffic and disabled vehicles.

The present invention is also adapted to use in the manufacture of reflectorized devices, particularly those having at least one reflex reflective face.

The present invention is especially well adapted for permitting one to use a single retro-reflective mold for fabricating a plurality of reflector bodies which, sometimes with slight modifications, are adapted for utilization in a variety of display, warning, and like devices.

Other and further objects and utilities will be apparent to those skilled in the art from a reading of the present specification taken together with the drawings.

BRIEF DESCRIPTION OF THE DRAWINGS

In the Drawings:

FIG. 1 shows a perspective view of a warning device incorporating one embodiment of a construction of the present invention;

FIG. 2 is a view in side elevation of the device shown in FIG. 1;

FIG. 3 is a vertical sectional view taken at the line III—III in FIG. 2;

FIG. 4 is an exploded view through an end region of a leg portion utilized in the device of FIG. 1;

FIG. 5 is an enlarged, detailed view of a portion of the structure shown in FIG. 3 and illustrating a sonic welding operation wherein a pair of reflector plates are secured together;

FIG. 10 is a fragmentary side elevational view of an alternative form of frame member suitable for use in a device of the type shown in FIG. 5;

FIG. 11 is a cross sectional view taken along the line X—X of FIG. 9;

FIG. 12 is a fragmentary sectional view of a device similar to that of FIG. 5, but showing an alternative form thereof;

DETAILED DESCRIPTION

Figure 6:
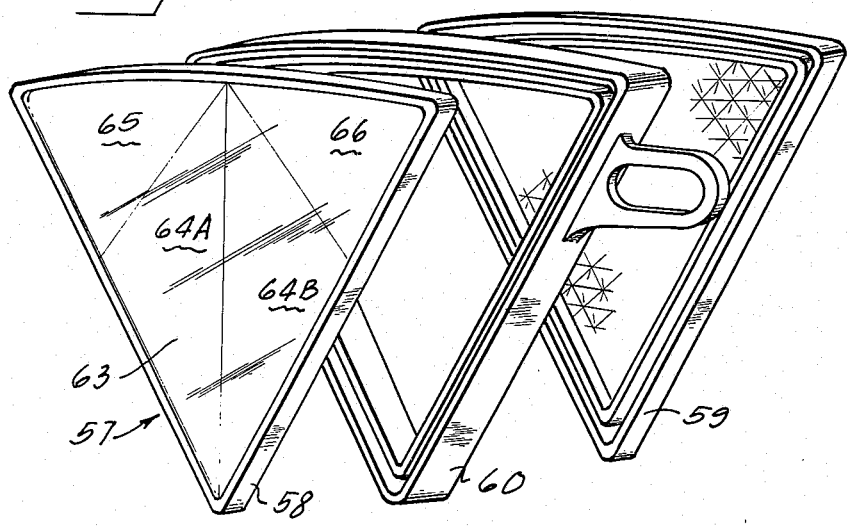
FIG. 6 is an exploded view of a reflector device incorporating an alternative embodiment of a construction of the present invention.

Turning to FIGS. 1 and 2, there is seen a warning device incorporating a construction of the present invention, such device being designated in its entirety by the numeral 15. Device 15 is seen to comprise a triangular assembly which is designated in its entirety by the numeral 16, a pedestal 17, and a pivot means 18. Device 15 is shown in an assembled configuration wherein the triangular assembly 16 is mounted on pedestal 17, but is pivoted on a pivot means 18 to extend normally to pedestal 17.

Triangular assembly 16 is seen to incorporate three leg members, herein each designated in its entirety by their respective numerals 20, 21 and 22. The leg members 20, 21 and 22 are adapted to coact together in abutting end-to-end relationship to form triangular assembly 16. Each leg member 20, 21 and 22 has an outside perimeter portion 23, 24 and 25, respectively, which is thickened relative to the adjacent inside perimeter portion 26, 27 and 28, respectively, of each leg 20, 21 and 22. The general constructional arrangement for legs 20, 21 and 22 of the triangular assembly 16 in a warning device 15 has been established by governmental agencies; see, for example, Motor Vehicle Safety Standard No. 125 which became effective Jan. 1, 1974 (available from D.O.T.).

Thus, according to this Standard No. 125, for example, the outside perimeter portion 23, 24 and 25 of leg members 20, 21 and 22 respectively, has an outer border of red reflex reflective material of uniform width which is not less than 0.75 nor more than 1.75 inches wide, and the inside perimeter portion 26, 27 and 28 of leg members 20, 21 and 22, respectively, has an inner border of orange fluorescent material of uniform width not less than 1.25 nor more than 1.30 inches wide. Furthermore, by this same Standard No. 125, each vertex of the triangular assembly 16 has a radius of not less than 0.25 inches and not more than 0.50 inches. All edges of triangular assembly 16 are rounded or chamfered, as desirable, to reduce the possibility of cutting or harm to the user. Each of the leg members 20, 21 and 22 of a device 15 by this Standard No. 125 is not less than 17 and not more than 22 inches in length, and is not less than 2 nor more than 3 inches in width. A triangular assembly 16 is in the form of an equilateral trilateral that stands in a plane not more than 10° from the vertical with the lower edge of the base (here leg member 21) of the triangular assembly 16 being horizontal and not less than 1 inch above the ground. The color of the red reflective material on a device 15 is defined, as in the color of the orange fluorescent material. Reflectivity and luminescence are specified.

In addition, by this Standard No. 125, device 15 must be capable, when erected in a configuration generally as shown in FIG. 1, of resisting the force of a horizontal wind of 40 miles per hour in any direction for three minutes. Furthermore, such a device 15 must be capable of passing through an environmental conditioning sequence involving extreme temperature and humidity conditions.

The construction of the present invention when incorporated into a device 15 readily permits one if desired to produce a device 15 which will pass and meet all of such specifications as set forth in the aforeindicated Standard No. 125. Details concerning color, particular materials of construction, or the like, as respects a particular individual embodiment of the present invention, are left to the wishes of a user, so far as the present invention is concerned, although it is naturally preferred to fabricate any embodiment of this invention of the finest quality material available. Plastic materials are preferred for such fabrication.

In the device 15, each leg member 20, 21 and 22 is herein constructed in the manner taught by the present invention. Construction of leg member 20 will now be explained as being representative. Referring to FIGS. 3 and 4, it will be appreciated that a construction of the present invention utilizes a closed loop of material, which is herein designated in its entirety by the numeral 31. Suitable materials of construction for the loop 31 and portions integral therewith include a polyvinyl chloride, vinyl chloride/vinyl acetate copolymers, a rubber modified polystyrene, a rubber modified polyacrylate, or the like, as those skilled in the art will readily appreciate. Loop 31 has elongated side wall portions 32 and 33 which are in spaced, generally parallel relationship to each other. In addition, loop 31 has shortened, relative to the side wall portions 32 and 33, opposite end wall portions 34 and 35, which interconnect the side wall portions 32 and 33.

Throughout, loop 31 has a cross sectionally H-shaped configuration wherein the inner side and end wall portions 36 of loop 31 are shorter in height than the adjacent interconnected (the interconnection being through bridge 37) outer side and end wall portions 38 thereof. A flange 39 is integral with an outer side wall portion 38 and projects laterally outwardly therefrom; flange 39 in a finished leg 20 becomes inside perimeter portion 26.

A pair of plates 41 and 42 are provided. Here, each plate 41 and 42 is molded with a reflex reflective surface portion 46 and 47, respectively. Each plate 41 and 42 has an outside face generally designated 43 and 44, respectively, and an inside face generally designated 46 and 47, respectively. In general, inside face 46 is a mirror image of inside face 47.

The inside face 46 or 47 of each plate 41 or 42, respectively, has a channel 48 and 49, respectively, formed therein. Channels 48 and 49 are each defined by an inner shoulder 51 and 52, respectively, and by an outer shoulder 53 and 54, respectively. The channels 48 and 49, respectively, each extend in spaced relationship to the side edges of each plate 41 and 42, respectively, along the outer perimeter thereof.

Each one of the plates 41 and 42 is elongated and is adapted to have its inside face 46 and 47, respectively, fit in mating engagement over one lateral side of loop 31 with the channel 48 and 49, respectively, being adapted to receive the inner wall portion 36 of the loop 31. Simultaneously, the outer perimeter or shoulder 53 and 54 of each respective plate 41 and 42 is adapted to lie adjacent the outer wall portion 38 of the loop 31.

Each inner shoulder 51 and 52, respectively, of the plates 41 and 42, projects laterally and normally away from its inside face 46 and 47, respectively, to an extent such that the outer end of each shoulder 51 and 52, respectively, is adapted to lie in adjacent abutting relationship with the corresponding outer end of the other such shoulder 51 and 52, respectively, when the plates 41 and 42, respectively, are each in such a mating engagement with the loop 31.

The abutting ends of shoulders 51 and 52 are bonded together by some convenient means, such as an adhesive, sonic welding (presently preferred), or the like. Illustrated, for example, in FIG. 5 is a sonic welding operation in the course of which the abutting shoulder ends of shoulders 51 and 52 are welded together using a sonic welding device 55A. Conveniently tabs 56 and 57 are provided on each outside face 43 and 44, respectively, of plates 41 and 42, to facilitate a sonic welding operation, and a bead 55 is integrally formed on at least one outer end of a shoulder such as shoulder 51.

In the triangular assembly 16 of device 15 (see FIG. 1), the upper end of inner perimeter portion 26 rests in a pocket portion 60 formed in the upper end of inner perimeter member 28 thereby to interlock leg 20 with leg 22. A pin (not shown) may be provided for extension through aligned holes 61 in assembled, engaged perimeter portions 26 and 28.

To disassemble triangular assembly 16, the leg 20 is simply moved upwardly to disengage leg 21 from leg 22. Then, leg 20 is revolvably moved about the pintle portion of a hinge member (not shown) in a direction moving initially inwardly as respects the paper on which FIG. 1 appears until the leg member 20 has revolved into a position which is in side by side relationship to the leg member 21. Similarly, the leg member 22 is moved in a direction initially outwardly as respects the paper on which FIG. 1 appears until the leg member 22 has revolved about the pintle portion of a hinge 62 into a position which is in side by side relationship to the leg member 21 but on the opposed side of leg 21 as respects that on which leg member 20 lies. In this configuration, the triangular assembly 16 may be considered to be in a disassembled condition.

The triangular assembly 16 engages pedestal 17 by means of the pivot means or swivel 18, the swivel 18 being revolvable in the pedestal 17.

In order to provide a thickened outside perimeter 23, 24 and 25 in a triangular assembly 16 which continuously circumscribes such triangular assembly 16, the inside perimeter portions 26, 27 and 28 of each respective leg 20, 21 and 22 is shortened relative to its associated respective outside perimeter portion 23, 24, and 25. Thus, outside perimeter portion 23 of leg member 20 projects beyond the termination of the inside perimeter portion 26 at one end of leg member 20 so that the inside end of the outside perimeter portion 23 lies against the end portion of the outside perimeter portion 25 of leg member 22, while the inside perimeter portion 28 of leg member 22 abuts in a symmetrical manner against the inside perimeter portion 26 of leg member 20. A similar arrangement is used in each of the other two corners of a triangular assembly 16.

Figure 7:
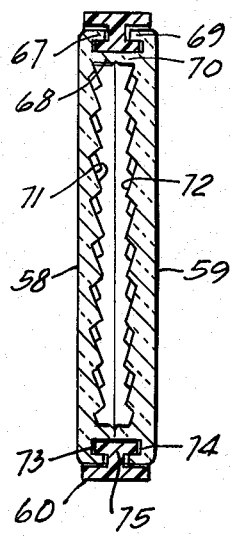
FIG. 7 is a transverse sectional view through the assembled device of FIG. 5.

In FIGS. 6 and 7 is seen a reflector device herein designated in its entirety by the numeral 57 which comprises a pair of reflector bodies 58 and 59 and a mounting frame 60. The mounting frame 60 is similarly constructed to the loop 31 (above), and the bodies 58 and 59 are similarly constructed to the plates 41 and 42 (above).

Body 58 is representative of both bodies 58 and 59 since these bodies may be formed by using the same mold. Body 58 has an outer face 63. The region or section 64A and the region 64B of face 63 can be considered to be comprised of so called standard retro-reflective facets (whereby incident light is retro-reflected through an angle of about plus or minus 30°), while the sections 65 and 66 of face 63 can be considered to be comprised of so called wide angle retro-reflective facets. Thus, the section 65 is adapted to retro-reflect incident light from the left of the body 58 at angles ranging from about 20° to 75° while the section 66 is adapted to retro-reflect incident light from the right at an angle of from about 20° to 75°. All angles are conveniently measured with respect to a vertical (or verticals) with respect to the face 63, as those skilled in the art will appreciate.

Each of the bodies 58 and 59 is equipped with a pair of spaced, parallel flanges or shoulders numbered 67 and 68 for body 58, and 69 and 70 for body 59, just as in the case of shoulders 51, 52, 53 and 54 of respective plates 41 and 42. The flanges 67, 68, 69 and 70 are integrally formed with their respective bodies 58 and 59, and they upstand normally from the respective back faces 71 and 72 of bodies 58 and 59. Also, comparably to the shoulders 51, 52, 53 and 54, each flange 67, 68, 69 and 70 extends continuously about the periphery of respective back faces 71 and 72 with one flange (flange 68 of body 58, and flange 70 of body 59) being inwardly spaced relative to the other flange (flange 67 of body 58, and flange 69 of body 59, respectively) thereof. The flanges 67 and 68 define therebetween a channel 73 in body 58 and the flanges 67 and 68, a channel 74 in body 59. In device 57, the channels 73 and 74 engage opposed, transversely extending end regions of the inside wall portion 75 of frame 60. The respective inner flanges 68 and 70 abut at their respective terminal edge portions, and are sonically welded together thereacross, or the like as desired.

Figure 8:
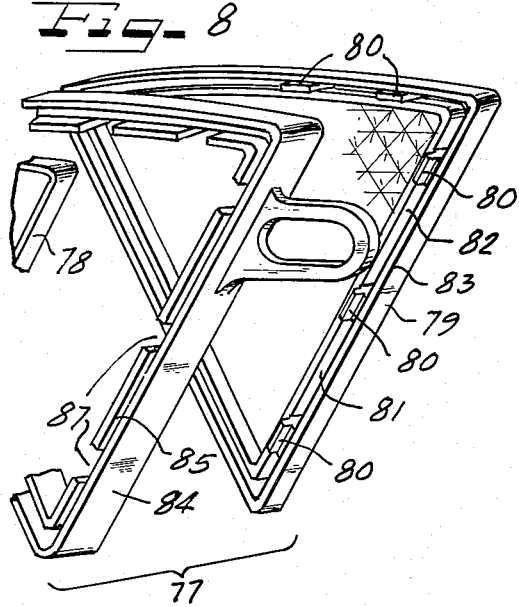
FIG. 8 is a fragmentary exploded view of a device similar to that of FIG. 5 but showing an alternative form thereof.
Figure 9:
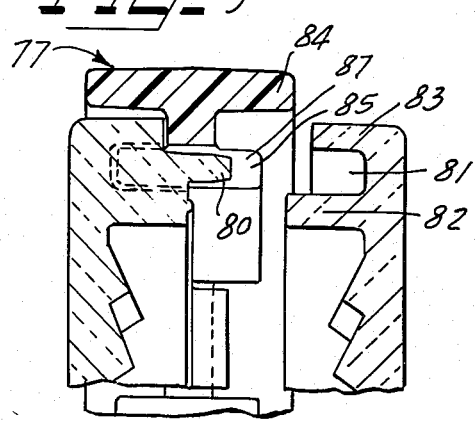
FIG. 9 is a fragmentary, partially assembled, sectional view of the device of FIG. 8 illustrating the manner in which component elements fit together.

In FIGS. 8 and 9 is shown a reflective device 77 which is similar to device 57 and which is comprised of a frame member 84 and reflector bodies 78 and 79. Body 79 is representative since bodies 78 and 79 are conveniently formable in the same mold. Thus, body 79 contains a plurality of integrally formed tabs 80 which upstand in the channel 81 in body 79. The tabs 80 upstand in the channel 81 to a height greater than the height of the flanges 82 and 83. The tabs 80 are adapted to locate and to align body 79 relative to a predetermined object, here, for example, the frame member 84.

Frame member 84 has its inside wall portions 85 provided with a plurality of notches 87 at preselected locations which are each adapted to receive therewithin matingly a predetermined one of the tabs 80 from each of the bodies 78 and 79, respectively, thereby to locate in a desired manner the reflector bodies 78 and 79 relative to the frame member 84. The frame member 84 is of integral, one piece, molded construction, in the manner of frame member 60, for example.

By providing the tabs 80 on not more than about one half of the perimetric region of each individual body 78 and 79, there is no interference with tabs 80 on different bodies 78 and 79 when a device 77 is assembled with the body 78 and 79 being engaged with frame member 84. Optionally, one may taper either the inside surface or the outside surface of a tab 80 (relative to, for example, body 79) so that such tabs 80 can exert a camming action within notches 87 and also so that such tabs 80 can aid in positioning bodies 78 and 79 relative to the side walls of a frame member 84, the interrelationship between the various elements and components being as illustrated in FIG. 9. When mounted on opposite sides of frame member 84, bodies 78 and 79 have their respective inside flanges 82 abut at terminal edge portions so that bodies 78 and 79 can be sonically welded together thereacross.

In place of using a frame member 84 in a reflective device 77, one may employ, alternatively, a frame member 88, as illustrated, for example, in FIGS. 10 and 11. In frame member 88, the inside wall portion 89 is in the nature of a flattened, flange-like, transversely extending member so that, in place of the characteristic H-shaped section associated with a frame member 84, the frame member 88 is characterized by having in cross-section a characteristic T-shape, as can be seen, for example, by reference to FIG. 11. The transverse width 90 of inside wall portion 89 of frame member 88 is such that, when, for example, the reflector bodies 78 and 79 are positioned on either side of the frame member 88 in an assembled fashion, the inside edge of the inside wall portion 89 lies adjacent the outside wall of each inside flange, such as flange 82 of the body 79. As in the case when one employs a frame member 84, the bodies 78 and 79, when mounted on opposed sides of a frame member 88, have their respective inside flanges 82 abut at terminal edge portions, so that the bodies 78 and 79 can be sonically welded together thereacross, or the like, about the frame member 88. Observe that the inside wall portion 89 is provided with a plurality of notches 91 adapted for receipt therewithin of the individual respective tabs 80, in a manner analogous to the notches 87 in frame member 84.

A single reflector body, such as a body 79, may be matingly engaged with a preformed backing member 93, as illustrated, for example, in FIG. 12. Here, the backing member 93 is provided with a pair of integrally formed spaced parallel flanges 95 and 96. Each flange 95 and 96 upstands normally from the back face 97 of backing member 93. The front face 98 of backing member 93 may be provided with means for mounting the backing member; for example, the backing member 93 is provided on front face 98 thereof with studs 99 and 100 for locating and mounting an assembly comprising backing member 93 and reflector body 78 on the rear fender of a bicycle, or the like. The flanges 95 and 96 extend continuously about the periphery of the back face 97 of backing member 93. The flange 95 is outwardly spaced relative to the flange 96. The flanges 95 and 96 define therebetween a channel 101. When a reflector body 79 is engaged with a backing member 93, the interrelationship between the flanges 82 and 83 is such that their respective terminal edge portions abut against the terminal edge portions of the corresponding flanges 95 and 96 of the backing member 93. With the tabs 80 projecting into the channel 101 of backing member 93, the backing member 93 may be sonically welded, or the like, to the reflector body 79 through and across abutting flanges 82 and 96, respectively, as those skilled in the art will appreciate. Preferably, at least one of the terminal edge portions of flanges 82 and 96 is equipped with a raised area or bead suitable for utilization in a conventional sonic welding operation, if such is employed as a fastening means.

Figure 13:
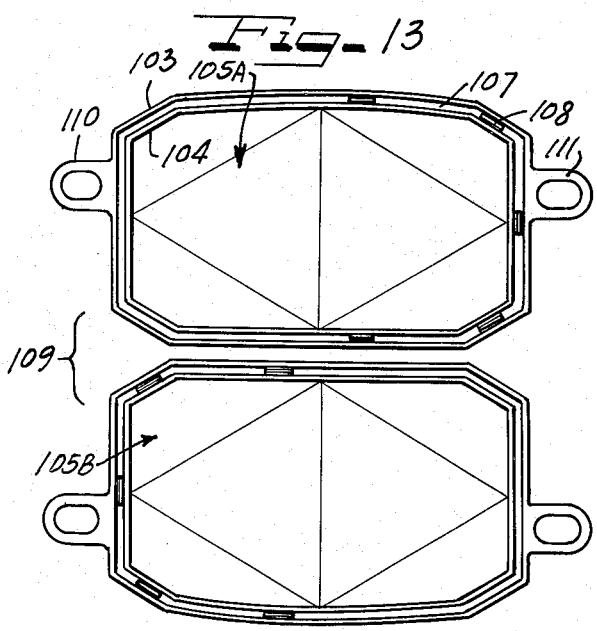
FIG. 13 is a disassembled view of a reflector device incorporating an alternative embodiment of a construction of the present invention showing the back faces of each reflector body used therein.
Figure 14:
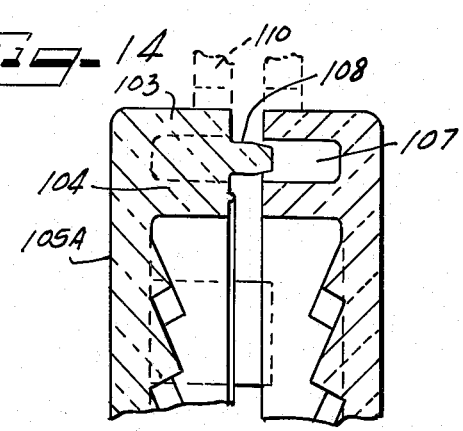
FIG. 14 is a fragmentary, partially assembled sectional view of the device of FIG. 12 illustrating the manner in which component elements fit together.

As will be appreciated from the foregoing description, a single reflector body of this invention can be used in the construction of a plurality of different reflector devices. By adjusting the relative heights of the respective flanges 82 and 83 in a body such as 79, a backing member or frame member such as 84 or 93 can be eliminated, and a pair of reflector bodies directly secured together. Such an embodiment is illustrated in FIGS. 13 and 14. Here, the flanges 103 and 104 of a molded reflector body 105A extend to a common height above the back face 106 of body 105A. In the channel 107 between the flanges 103 and 104 are integrally formed a plurality of tabs 108, the tabs 108 being positioned only on one half of the perimeter of the body 105A. When a body 105A is conveniently brought together with another but identically molded body 105B in the manner shown, for example, in FIGS. 13 and 14 there is produced a single reflector device 109.

The respective bodies 105A and 105B may be sonically welded together if desired through abutting terminal edge portions of the adjoining inside flanges 104 when bodies 105A and 105B are assembled.

Body 105A is shown formed with a pair of opposed ears 110 and 111 integrally formed thereon adjacent the terminal edge of each outside flange 103 for mounting the assembled device 109. When a pair of bodies 105A and 105B are brought together in assembled fashion, the ears 110 and the ears 111, respectively, of bodies 105A and 105B come into face to face engagement with each other on their respective adjoining inside facial portions, thereby improving the strength of the fastening means in the assembled device 109, as those skilled in the art will appreciate.

Those skilled in the art will appreciate that the positioning of an inner flange in spaced relationship to an outer flange is a reflector body of the type provided by the present invention offers a plurality of advantages. For one thing, heat shrinkage problems associated with plastic molding are either overcome entirely or are reduced to a minimum level in peripheral regions of a molded reflector body.

For another thing, the inner flange provides a very convenient post or base suitable for use in sonic welding operations, as such are desired to be employed in the fabrication of reflector devices. A pair of abutting inner flanges are well suited for sonic welding operations, particularly when one of the flanges is equipped with a bead on its terminal edge portion, as those skilled in the art will appreciate, though other types of fastening means, such as an adhesive, may be used.

For another thing, the outer flange is available for positioning or mounting a particular reflector body relative to another body, such as a frame member, or even another body like the reflector body itself. The outer flange member, in the case where a pair of bodies are matingly engaged with the respective front faces of the bodies being opposed, and with the respective back faces thereof being in spaced, adjacent relationship, is adapted to provide a protective wall-like means which surrounds the sonically welded portions and adds greatly to the durability, rigidity, and stability of a product reflector assembly.

For another thing, the channel formed between the two flanges members provides an excellent means for aligning one such body relative to another or other such body, particularly when tabs are provided integrally formed within a given channel, as has been hereinabove illustrated.

Other and further embodiments and variations of the present invention will become apparent to those skilled in the art from a reading of the present specification taken together with the drawings, and no undue limiations are to be inferred or implied from the present disclosure.

We claim:

1. In a one-piece reflector body of molded, transparent plastic, said body being generally flattened and having a generally smooth front face and a back face in spaced relationship thereto with a plurality of lenticular facets integrally formed therein which are adapted for retro-reflection of incident light striking the front face thereof at predetermined angles, the improvement which comprises a pair of spaced, parallel flanges, each such flange (a) being integrally formed with said body, (b) upstanding normally from said back face, and (c) extending continuously about the periphery of said back face, one such flange being inwardly spaced relative to the other thereof, said flanges defining a channel therebetween.

2. The body of claim 1 wherein said flanges extend to a common height above said back face.

3. The body of claim 1 wherein the inner one of said flanges is higher than the outer one thereof.

4. The body of claim 1 wherein the terminal edge of the inner one of said flanges has a raised portion thereon adapted for sonic weldability.

5. The body of claim 1 wherein a plurality of integrally formed tabs upstand in said channel to a height greater than the height of said flanges, said tabs being adapted to locate and align said body relative to a predetermined object.

6. The body of claim 5 wherein said predetermined object is a said body, and the resulting such pair of bodies matingly engage each other with said respective front faces thereof being opposed, said back faces being in spaced, adjacent relationship, and said respective outer and inner flanges being adapted to abut at their respective terminal edges.

7. The body of claim 5 wherein said predetermined object is a frame member, said frame member having a perimeter portion adapted to matingly engage with the periphery of said back face, said perimeter portion having notched regions defined therein at preselected locations which are each adapted to receive therewithin matingly a predetermined one of said tabs, thereby to locate in a desired manner said body relative to said frame member.

8. A pair of the bodies of claim 1 matingly engaged with each other, said respective front faces thereof being opposed, said back faces thereof being in spaced, adjacent relationship, and said respective inner flanges thereof being adapted to abut at their respective terminal edges.

9. The bodies of claim 8 sonically welded together at said abutting terminal inner flange edges.

10. The bodies of claim 8 wherein said respective outer flanges are adapted to abut at their terminal edges.

11. The bodies of claim 8 wherein said respective outer flanges are in spaced relationship to each other and a frame member is interposed therebetween.

12. The bodies of claim 11 wherein said frame member extends into a portion of each of said respective channels.

13. The bodies of claim 8 wherein not more than one half of the perimetric region of each of said bodies has a plurality of integrally formed tabs each such tab upstanding in each such body's said channel to a height greater than the height of each such body's respective flanges.

14. The bodies of claim 13 sonically welded together at said abutting terminal inner flange edges.

15. The bodies of claim 13 wherein said respective outer flanges are adapted to abut at their terminal edges.

16. The bodies of claim 13 wherein said respective outer flanges are in spaced relationship to each other and a frame member is interposed therebetween.

* * * * *